United States Patent [19]

Lemke

[11] 4,302,790

[45] Nov. 24, 1981

[54] MAGNETIC RECORDING HEAD WITH EFFECTIVE MAGNETIC GAP LENGTH LESS THAN ABOUT 15μ INCHES

[75] Inventor: James U. Lemke, Del Mar, Calif.

[73] Assignee: Eastman Kodak Company, Rochester, N.Y.

[21] Appl. No.: 29,095

[22] Filed: Apr. 11, 1979

[51] Int. Cl.³ .......................... G11B 5/25; G11B 5/62
[52] U.S. Cl. ..................................... 360/119; 360/131
[58] Field of Search ........................................ 360/119

[56] References Cited

U.S. PATENT DOCUMENTS

| | | | |
|---|---|---|---|
| 3,079,468 | 2/1963 | Morey | 360/119 |
| 3,106,617 | 10/1963 | Fox | 360/119 |
| 3,686,468 | 8/1972 | Garnier | 360/119 |
| 3,862,115 | 1/1975 | Gerry | 360/119 |
| 3,984,874 | 10/1976 | Mano | 360/119 |
| 4,163,823 | 8/1979 | Legras et al. | 428/304 |

OTHER PUBLICATIONS

"Thin Film . . . Write", Electronics, p. 76, Jun. 1979.
"How . . . Spacer", McKnight, Journal of the Audio Eng. Society, Dec. 1978, vol. 26, No. 12, p. 930.

Primary Examiner—Robert S. Tupper
Attorney, Agent, or Firm—R. F. Cody

[57] ABSTRACT

Rather than the prior art practice of magnetically recording with a relatively long record gap, the disclosed invention teaches the use of a magnetic record gap length of less than 15μ". Such a record gap length provides improved performance in a variety of recorders.

12 Claims, 8 Drawing Figures

MAGNETIC RECORDING HEAD WITH EFFECTIVE MAGNETIC GAP LENGTH LESS THAN ABOUT 15µ INCHES

BACKGROUND OF THE INVENTION

1. Field of the Invention

This invention relates in general to magnetic recording, and in particular to improvements therein.

2. Description Relative of the Prior Art

In the magnetic recording of information signals on a magnetic medium such as magnetic tape, a magnetic record core having a high reluctance gap therein is (usually) employed. Magnetic flux, corresponding to a signal to be recorded, is generated (by suitable means) in the record core and, as the flux bridges the record core gap, it extends outwardly from the gap. By appropriately placing the record core in contact with the medium, the fringe field flux extending from the gap licks the magnetic medium and, remanently, records signal information in the medium. To play back the signal information recorded in the medium, a gapped magnetic playback core is (usually) employed. The playback core (which in some instances may be the record core used for playback purposes) gathers, at its gap, the signal flux which was recorded in the medium and (assuming there is relative motion between the playback core and medium while such flux is being gathered) produces an electric signal across a coil inductively linked to the playback core. In connection with the matter of signal playback, it is well known to make the playback gap about half as long as the record gap in order to play back short wavelength recorded signals, "wavelength", in this regard, referring to the distance, along the recording on the recording medium, between successive similarly magnetized portions of the medium. That is, the length of the playback gap defines the shortest signal wavelength which can be recovered during playback of recorded signals.

It is believed to be appropriate at this point of address the matter of gap length definition: the term "gap length" as used throughout this specification, whether in connection with record or playback cores, should not be taken to mean the physical distance between the magnetic core poles at opposite ends of a gap; and which distance is sometimes referred to as the "physical gap length", or "optical gap length", or "mechanical gap length". Rather, "gap length" as used throughout this specification, unless otherwise indicated, is taken to mean "magnetic gap length", which is the effective gap length. The magnetic gap length of a magnetic head may be determined, for example, by (1) recording, with a reference magnetic head of an appropriate type, a set of test signals of various wavelengths on a magnetic medium, and (2) determining the wavelength at which a head under test experiences a null corresponding to a ratio of gap length to wavelength which equals one—as discussed by Athey, *Magnetic Tape Recording*, NASA Publication No. SP-5038, page 66—such determined wavelength equalling the magnetic gap length of the head under test. In support of the proposition that there is a distinction between the magnetic and physical gap lengths, Athey further states (same page):

". . . the effective length of the gap, judged from the position of the response nulls, is longer than the physical gap."

In a test as described above, it will be appreciated that a record head, the magnetic gap length of which is to be determined, is employed in a playback mode to play back the indicated test signals.

Just as it is well known to employ a playback gap length which is optimally short, it has also been known in the art to employ, where practical, a record gap length which is relatively long: the theory is that the trailing edge of a gap with respect to a relatively moving recording medium is the primary head part associated with the recording process; such being the case, it has been reasoned that by making the record gap length relatively large, record flux will significantly extend outwardly from the record gap, and thereby cause the magnetic medium to record, efficiently, throughout its depth, albeit in a region downstream of the record gap. Admittedly the length of the record gap affects the dimensions of the recording zone within the magnetic medium: the shorter the record gap length, the smaller the recording zone for the same recording current. This is an important consideration, since it correlates during playback with the matter of resolving short wavelength signals. Certainly, in the case where a narrow band of relatively short wavelength signals is to be recorded, and played back, the record gap can be relatively short. Where, however, long wavelength recording is involved, as in the case of a broadband recorder, a recording impasse results. This point was addressed by C. D. Mee in his definitive text, *The Physics of Magnetic Recording*, 1964, John Wiley and Sons, Inc., New York, page 245, where he states:

". . . the recording zones for a narrow gap recording head are shown . . . it can be seen that the narrowest recording zone 1) is achieved, but when sufficient field is applied to magnetize the tape fully, the recording zone is just as large as that from the wide gap head. Hence no advantage is to be gained by use of extremely narrow gaps for wideband recording."

Similarly, Athey, in his above-referred to work (page 23) states:

"The operating gap in the reproduce head, however, is usually considerably smaller than that in the record head . . ."

Others in the field have also made this point, e.g., Gordon White, *Video Recording Record and Replay Systems*, Crane, Russak and Company, Inc., 1972, and Charles E. Lowman, *Magnetic Recording*, McGraw-Hill Book Company, 1972.

Implicit in the above reference to wideband recording is a recognition that recorders, such a quadruplex and helical scan video recorders, can employ the same relatively narrow gap head(s), for record and playback purposes, because they are relatively short wavelength/narrow band recorders. Indeed, as will appear in the representative table below, such recorders are all adapted to record less than a single octave:

| Recorder | Wavelength | Minimum Required Magnetic Gap Length |
|---|---|---|
| Sony Betamax | 36µ"–50µ" | 36µ" |
| U-Matic | 47µ"–68µ" | 47µ" |
| EIAJ-1 | 60µ"–87µ" | 60µ" |
| Quadruplex | 100µ"–167µ" | 100µ" |
| | µ" = microinch | |

It will be appreciated that some prior art video recorders, e.g. the Betamax recorder, record, by means of the same head, a narrow band luminance signal and a separate narrow band chroma signal such that there is more than one octave between the extreme ends of the chroma and luminance bandwiths. This is not "wideband recording" as contemplated by the invention, and is in actuality the recording of a pair of discrete narrow band signals each of which is no more than about an octave in bandwith. Evidence that such recordings are discrete may be appreciated from the fact that each such recording requires its own separate equalization. For wideband recording, as, for example, in an instrumentation recorder, or in the direct recording of audio and video information at relatively slow writing speeds, the usual practice is to employ a wide gap head for recording, and a narrow gap head for playback. Typical instrumentation recorders, according to the above reference by Lowman, page 35, for example, employ record and reproduce gaps as follows:

| Response | Record Gap | Reproduce Gap |
|---|---|---|
| A. 100 kHz @ 60 ips | 500μ" | 250μ" |
| B. 600 kHz @ 120 ips | 500μ" | 80μ" |
| C. 2 mHz @ 120 ips | 250μ" | 25μ" |

And, if the shortest recoverable wavelength is calculated for the above A, B and C responses, it will be appreciated that the reproduce gaps which are stated are, in fact, the physical gap lengths, the upper requisite limits to the sizes of magnetic gap lengths being, respectively, 600μ", 200μ", and 60μ".

SUMMARY OF THE INVENTION

Contrary to the general and specific teachings of the art, it has been found that if recording is practiced with a magnetic record gap which is about one or more orders of magnitude shorter than any heretofore contemplated, greater playback efficiency is obtained, especially for bandwiths greater than one octave. Further, when an extremely short record gap (hereinafter sometimes referred to as a "microgap") is employed to record in a medium having both a cubic crystalline, as well as acicular shape, anisotropy, the efficiency of the recording operation is itself increased. Also, by employing an extremely short record gap in connection with a magnetic medium of a presently preferred type to be identified below, the noise power ratio (NPR) of the recording playback can be rendered, desirably, flat.

These, as well as other features of the invention, will be discussed below in connection with the figures, of which:

The present invention came about in the first instance during an attempt to provide a reasonably good quality broadband audio recording on magnetic tape, which recording could both be recorded and played back, simply and economically, with the same head at the incredibly slow head-to-tape playback speed of 0.04 inches per second (ips). There is, per the current state of the art, no magic in recording at such a speed with a wide gap record head and, assuming the availability of a very short gap playback head, recovering very short wavelengths. To allow for a playback speed of 0.04 ips (which, for a track width of 5 mils, translates into two hours of playback for each one and one-half square inches of tape), the playback head—assuming a bandwith of up to 3 kHz—necessarily has to have a magnetic gap length of 13μ" or less. Such a short playback gap length, per the whole teaching of the art, has meant that, if the playback gap were used as the record gap as well, there would then be very little fringe field available for recording in the medium. Thus, an impasse was expected to evolve: with virtually no recording expected to take place in the medium, there could not be any significant playback. Contrary to what was expected, however, it was found that, if recording takes place with a magnetic record gap length on the order of 15μ" or less, meaningful playback is not only possible, it is better.

The invention is discussed below first in relation to the matters of gap influence on signal-to-noise ratio (SNR), distortion, and channel capacity; then the inventive use of migrogap recording is discussed in relation to a medium of the general type disclosed in U.S. Pat. No. 4,163,823, whereby the results of such a combination, as relating to both SNR and NPR, is further developed.

Figure 1:
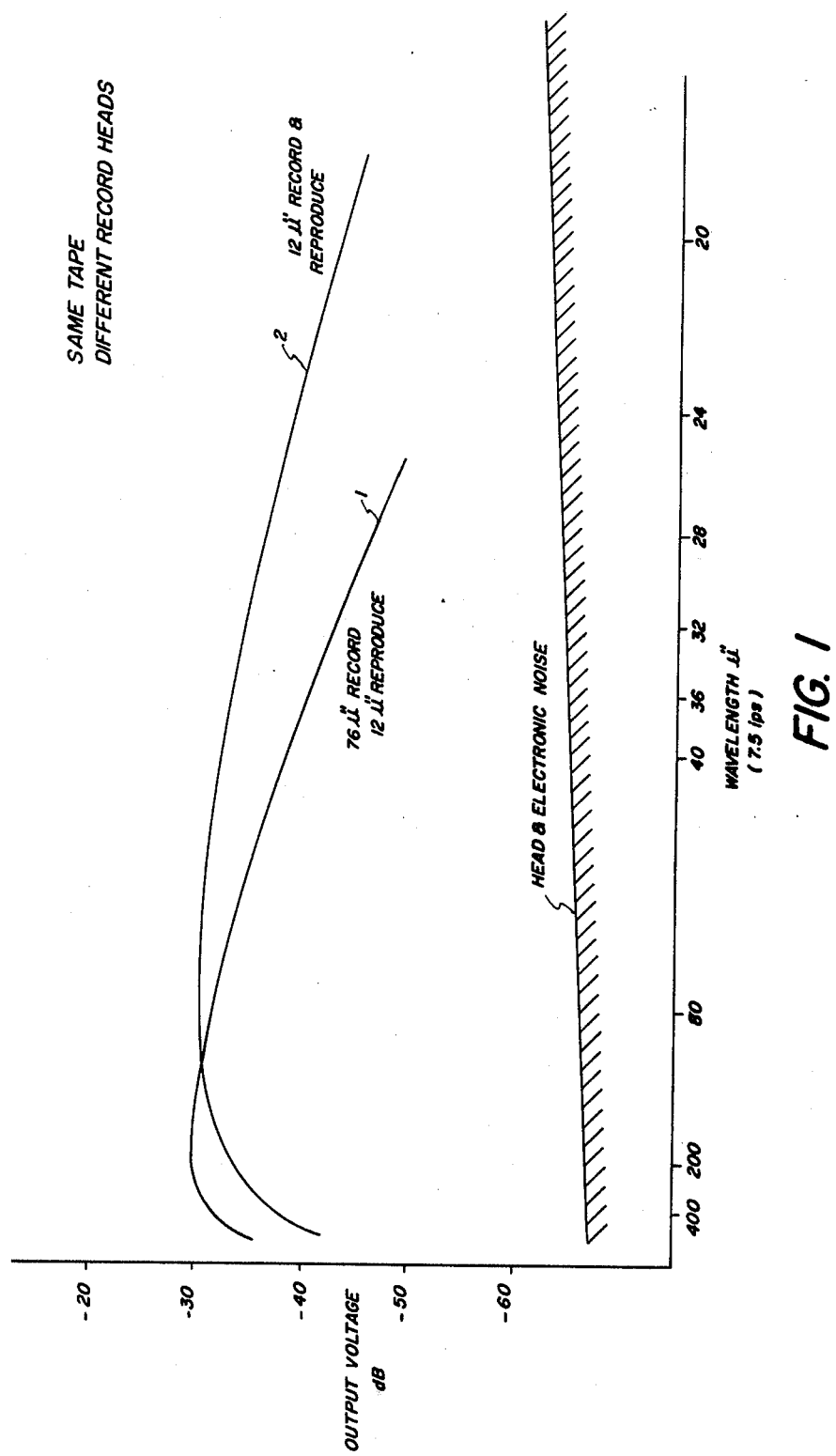
FIG. 1 depicts a pair of curves useful in illustrating the advantages of a microgap recording vis-a-vis a recording made by use of a conventional record gap.

Reference should now be had to FIG. 1, which depicts a pair of curves showing the actual playback performance of recordings made on the same recording medium (viz., the medium described in U.S. Patent Application Ser. No. 775,118) using, respectively, a conventional magnetic record gap and a magnetic record gap according to the invention. With respect to curve 1, a conventional physical record gap length of 76μ" was employed to record a band of frequencies from DC to greater than 500 kHz, playback being obtained by use of a playback magnetic gap length of 12μ". With respect to curve 2, a magnetic gap length of 12μ" was employed, per the invention, for both record and playback purposes. Although there appears to be a relatively small loss of about 6 dB at long wavelengths, there is, when practicing the invention, not only a gain of about 11 dB at a bandedge corresponding to a wavelength of about 26μ", but the playback bandedge, by virtue of the invention, is extended to a point corresponding to a wavelength less than 20μ".

Bearing in mind that, according to Shannon's theorem (*Transmission Systems for Communications,* Bell Telephone Laboratories, Inc., 1964, page 610), the capacity C of a communication channel to transmit information without error is in proportion both to the SNR of the channel and to the bandwith W of the channel, i.e., $$C = W \log_2(1 + SNR),$$

it is apparent from the curves of FIG. 1 that the channel capacity of a microgap recording according to the invention is significantly better than one made by conventional practice. That is, the area under curve 2 is not only greater than the area under curve 1 because of an improvement in overall SNR but, since microgap recording significantly extends the playback bandwidth, channel capacity C is increased still further.

Figure 2:
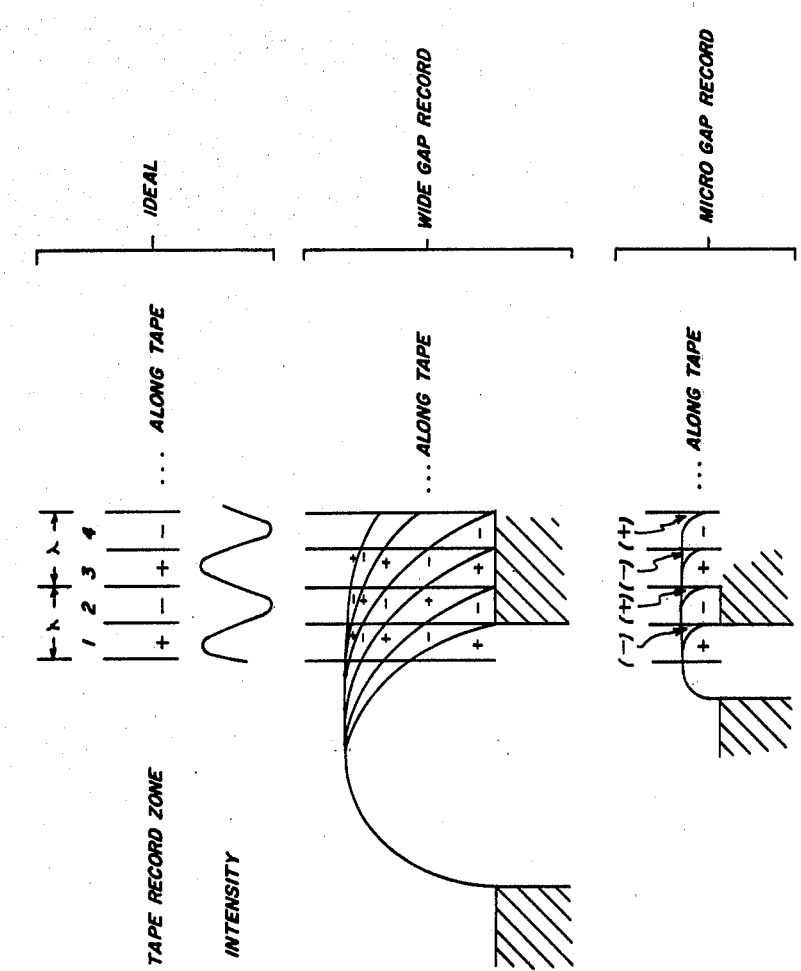
FIG. 2 depicts diagrams which are useful in explaining a theory directed to the operation of microgap recording.

For a qualitative assessment of why microgap recording is more productive of recordings manifesting better playback SNR, reference should now be had to FIG. 2 and the qualitative showings thereof: In the ideal recording of a given wavelength λ, well-defined record zones appear in the medium (tape). Zone 1 is exclusively positively magnetized; zone 2 is exclusively negatively magnetized; zone 3 is exclusively positively magnetized; zone 4 is exclusively negatively magnetized, etc. In each zone, however, the intensity of the magnetism goes from a minimum to a maximum and back to a minimum. Thus, in connection with such an ideal recording, were it possible to move a playback head having an infinitely small playback gap along and in contact with the recording, flux would enter the head gap in proportion to the recorded intensity and produce, thereby, a distortionless playback signal having the wavelength λ.

As is the case, however, magnetic recording of a signal having a wavelength λ does not occur as ideally depicted. Rather, as a record head moves, relatively, along a recording medium, arcuately-shaped recording zones are created in the medium. The recording labeled "Wide Gap Record" in FIG. 2 depicts a typical state-of-the-art recording of a signal with the wavelength λ. To be noted is that the zone 2, 3, 4, etc., recordings overlap the zone 1 recording, whereby, when endeavoring to play back the zone 1 recording, two things adversely affect playback: first, the flux contribution of the even-numbered zones 2, 4, etc., knocks down the resultant flux which can be discerned during playback, thereby reducing playback SNR in the first instance; second, as a result of the knock down of the resultant playback flux by the even-numbered zones, 2, 4, etc., the playback flux is not linearly related to the recorded signal, thereby creating distortion during signal playback.

In accordance with the practice of the invention, the overlap of adjacent record zones is minimized; see the recording labeled "Microgap Record" appearing in FIG. 2. With much less zone-overlap present, playback flux knockdown (as well as distortion) is minimized, thereby resulting in playback performance as depicted in curve 2 of FIG. 1.

As is known, in practicing magnetic recording according to the prior art, the actual recording which takes place in a medium which is moving relative to a record gap occurs at a point within the medium which is downstream of the record gap . . . and at which point the strength of the magnetizing field approximates the coercivity of the medium. In microgap recording, however, the point at which actual recording takes place is virtually over the record gap itself. Such recording has the favorable effect of reducing differential phase shift between simultaneously recorded signals, thereby resulting in a reduction of and simplicity of electronic components which would otherwise be necessary to phase equalize the signals being recorded. In other words, microgap recording reduces vertical magnetization in the tape, and which magnetization is impossible to equalize simultaneously with the desired longitudinal magnetization.

When microgap recording is practiced in connection with a recording medium characteristic of the recording medium disclosed in U.S. Pat. No. 4,163,823 still further improvement in playback performance results. Curve A of FIG. 3 indicates the actual playback performance of a microgap recording (12µ" record gap) practiced with a commercially-available recording tape, viz., Ampex 797 instrumentation tape available from the Ampex Company. As is known, the particles which form 797 tape have shape anistropy. A medium such as that disclosed in U.S. Pat. No. 4,163,823, by contrast, is comprised of particles having additive shape and cubic crystalline anistropies. Recording flux in such a medium, although effective along orthogonal axes, is most effective in inducing remanence along the geometric axes of the magnetizable particles which form the medium. With greater efficiency so provided during recording, a medium such as disclosed in U.S. Pat. No. 4,163,823, when microgap recorded with the same head that was used to provide the curve A response in FIG. 3, exhibits actual playback performance as indicated in curve B of FIG. 3. To be noted is that, once again, not only is playback SNR better at a signal frequency corresponding to a wavelength of 26µ", but that, with a medium having additive cubic crystalline and shape anistropies, playback SNR is better at both the very long and the very short (e.g., 18µ") wavelengths.

Figure 3:
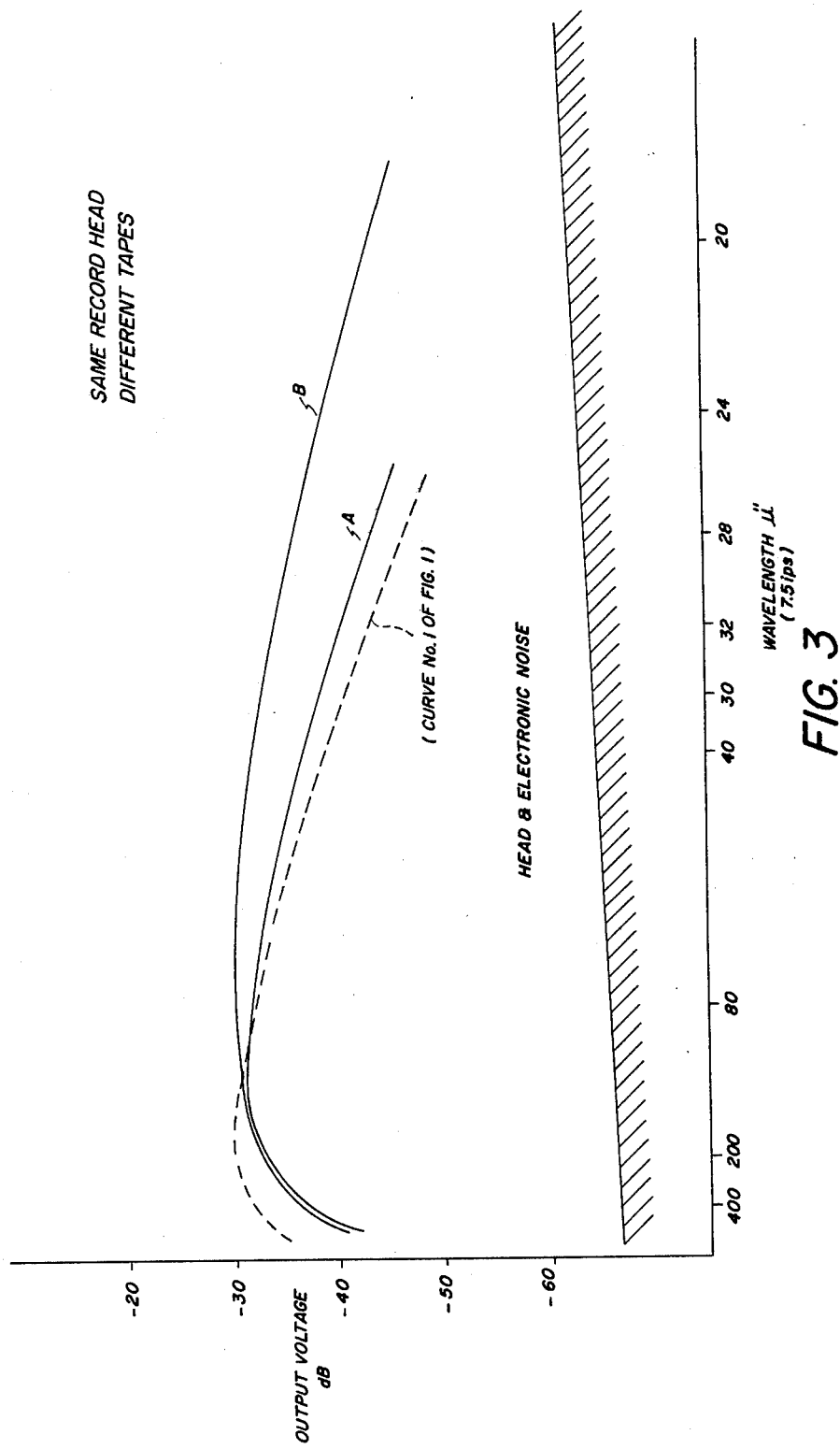
FIG. 3 depicts a pair of curves useful in illustrating the advantages of microgap recording in connection with a presently preferred recording medium.

For sake of convenience, curve 1 of FIG. 1 is recreated in FIG. 3, thereby to show that, whereas microgap recording provides improvement irrespective of the recording medium, a still greater, and dramatic, improvement in playback performance is provided by proper choice of the recording medium.

Turning now to the matter of NPR, such is the ratio of the power of recorded white noise to the zero signal noise at predetermined slots across the spectrum, such slot noise resulting from intermodulation effects caused by the recording medium itself. Ideally, there should be no such slot noise, and the NPR should be as large as possible. Further, the NPR should be reasonably flat with frequency, for then the entire bandwidth can be utilized most efficiently. Bearing in mind that it may be desirable to pre-emphasize the high frequency components of a bandwidth of frequencies to be recorded—and to deemphasize such high frequency components during playback, thereby to improve the SNR at such frequency—reference should now be had to the qualitative showings of FIGS. 4a and 4b.

Figure 4:
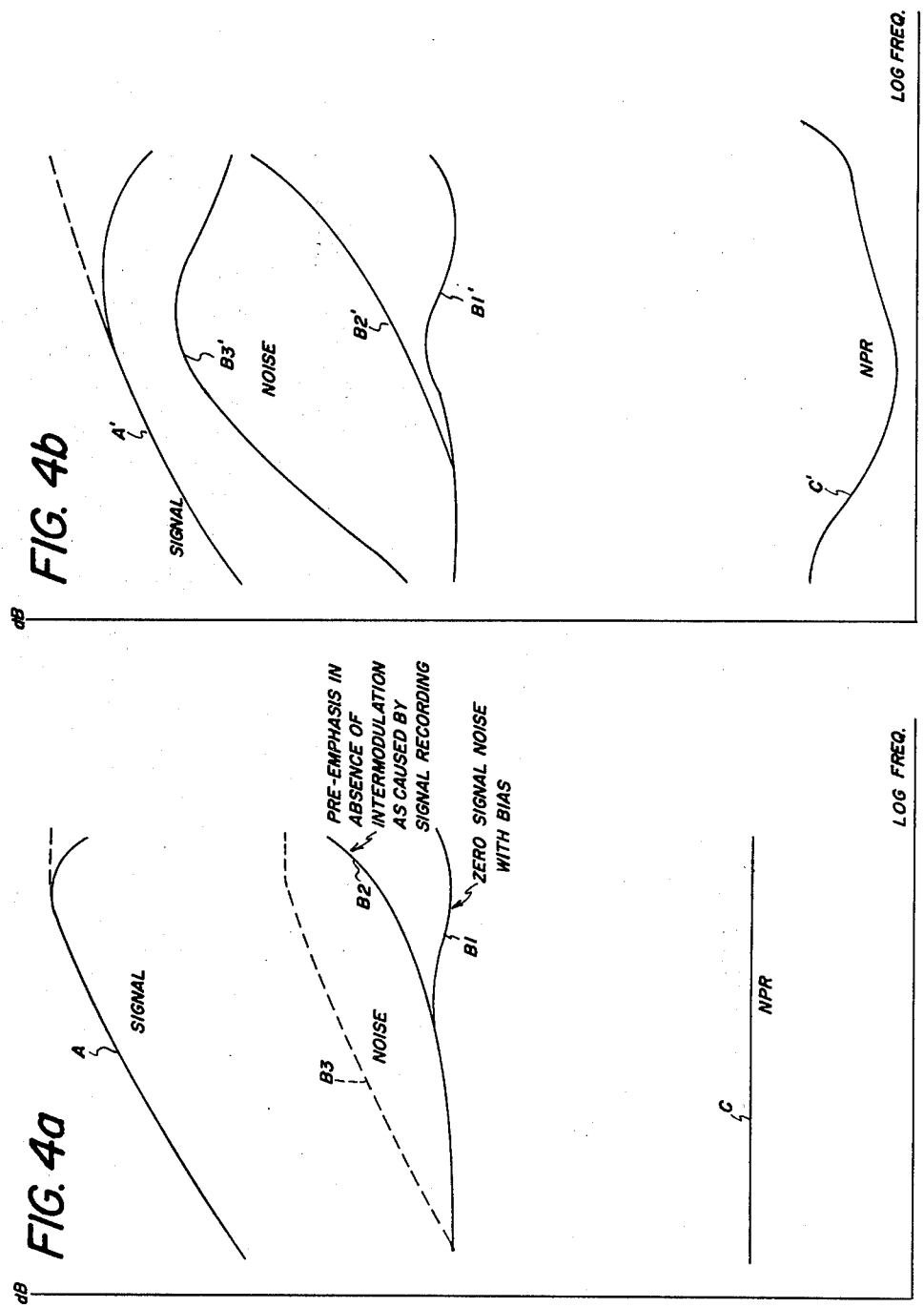
FIGS. 4a and 4b depict diagrams useful in explaining improved NPR performance resulting from microgap recording.

Curve A of FIG. 4a is the playback performance curve for a microgap recording, made on a medium such as disclosed in U.S. Pat. No. 4,163,823, at constant current, variable frequency. As was indicated above, high-frequency components, prior to the recording thereof, may be pre-emphasized (dashed line associated with Curve A) whereby, during their playback, they may be de-emphasized to produce an improvement in short wavelength SNR.

Curve B1 is a plot of the playback noise (head, electronic and medium noise) associated with a microgap recording made with zero signal and bias. Curve B2 is a plot of the playback noise (head, electronic and medium noise) associated with a microgap recording, but which was made with a pre-emphasized zero signal and bias. And, Curve B3 is a plot of the playback noise (head, electronic and medium noise) associated with a microgap recording of a pre-emphasized white noise signal as discussed above. To be noted is that the intermodulation products caused by the recording of such a white noise signal have raised the noise level from that shown in Curve B2 to that shown in Curve B3. Because of the ability of a medium such as disclosed in U.S. Pat. No. 4,163,823 to remain relatively linear over a wide range of input levels, and thereby limit the generation of intermodulation products, high-frequency pre-emphasis provides a flat NPR at a high and useful level. See Curve C.

In Curve A' of FIG. 4b, on the other hand, the playback performance of a state-of-the-art recording at constant current, variable frequency, is depicted. The record head so employed was provided with a relatively wide gap, and the medium was one of several commercially-available types. Were it desired to pre-emphasize the high-frequency components associated with Curve A' (dashed line, Curve A') to a level such that there is the same output at bandage as was depicted in FIG. 4a, intermodulation products—attributed primarily to the recording medium itself—would create noise components up and down the recording spectrum.

Curve B1' is a plot of the playback noise (head, electronic and medium noise) associated with a state-of-the-art recording made with a zero signal and bias. Curve B2' is a plot of the playback noise (head, electronic and medium noise) associated with a state-of-the-art recording made with a pre-emphasized zero signal and bias. Curve B3' is a plot of the playback noise (head, electronic and medium noise) associated with a pre-emphasized white noise input signal as discussed above. While pre-emphasis of the high-frequency components associated with Curve A' does improve SNR at the short wavelength bandedge, pre-emphasis undesirably plays havoc with the level and flatness of the NPR, as depicted in Curve C'. Thus, it will be appreciated, the cooperation between a microgap record head and a medium such as disclosed in U.S. Pat. No. 4,163,823 provides advantages which are largely attainable by such cooperation.

Figure 5:
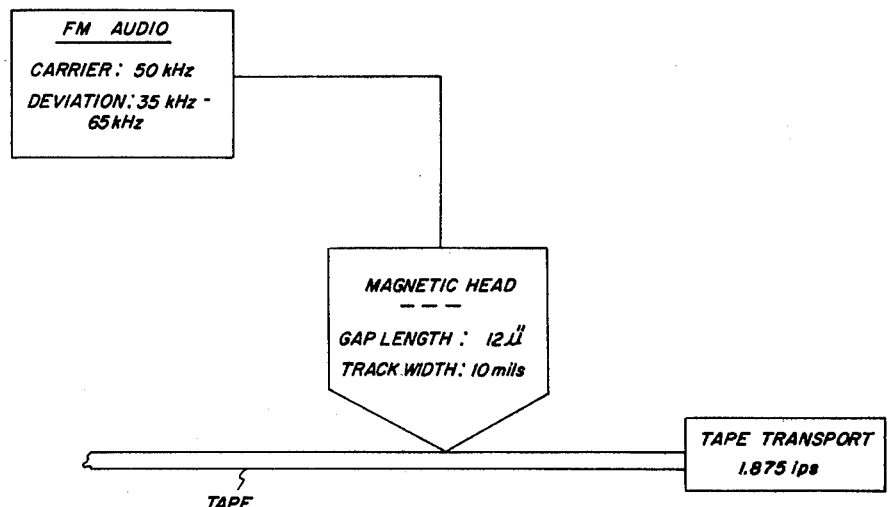
FIGS. 5 through 7 are diagrams of records made possible by use of microgap recording.
Figure 6:
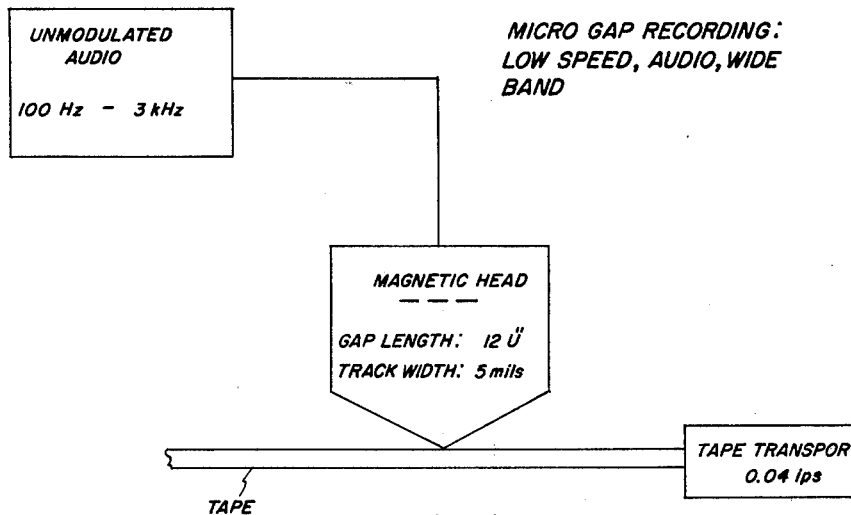
Figure 7:
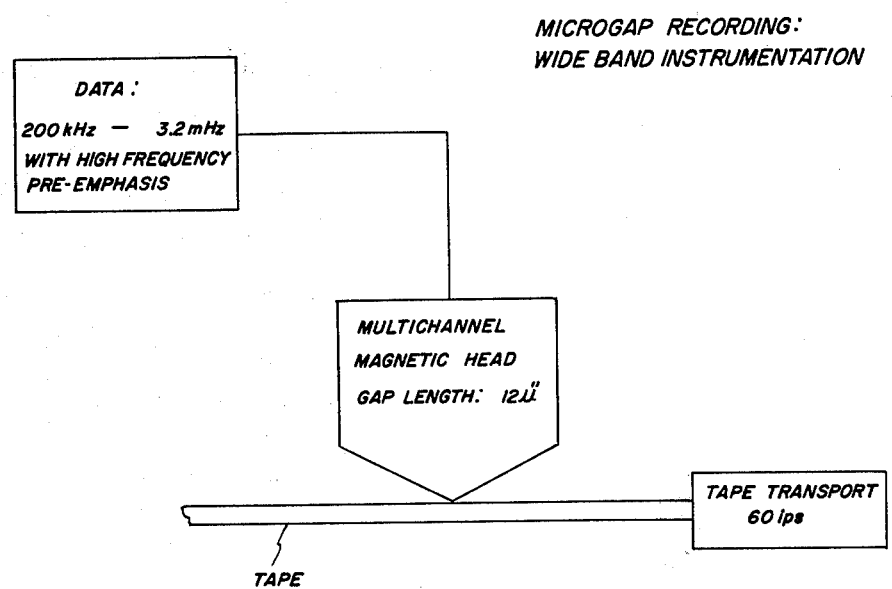

Bearing in mind the above-discussed advantages of microgap recording, reference should now be had to FIGS. 5 through 7, which show a variety of embodiments which evidence the versatility of recording according to the invention. In all instances, the record head is used for playback purposes, although it will be appreciated that separate playback heads, having like or smaller playback gaps, may be employed. And, in presenting the invention in its best mode, the recording medium employed is that which is disclosed in U.S. Pat. No. 4,163,823.

FIG. 5 depicts a narrow-band audio FM recorder in which tape is transported at a conventional rate (1⅞ ips) and which, because of microgap recording (record gap: 12μ") permits good playback of a recorded wavelength/deviation from 56μ" to 28μ" (wavelength of carrier: 38μ"), such playback translating after demodulation, into an outstanding audio response of 60 dB at the upper bandedge of an audio spectrum extending from DC to 12 kHz.

Whereas the apparatus disclosed in FIG. 5 is adapted to process a spectrum which is a bit greater than one octave (although it can process a spectrum less than an octave, at a sacrifice in performance), the apparatus of FIG. 6 is adapted to record directly, and play back, about five full octaves of audio, i.e., from 100 Hz to 3,000 Hz, at a record/playback speed of only 0.04 ips. The recorded wavelengths, at such a speed, range from 48μ" to 14μ", the playback SNR being reasonably good at 30 dB.

In FIG. 7, an instrumentation recorder, adapted to process four octaves of data, is depicted. Whereas a conventional instrumentation recorder employs a wide gap record head (typical physical gap length: 500μ") and a separate, narrow gap playback head ... and tape transports at 120 ips in order to provide good playback of from 200 kHz to 1.2 mHz ... the inventive use of a microgap of 12μ" for both record and playback purposes provides good playback of wavelengths corresponding to frequencies between 200 kHz and 3.2 mHz, while employing a halved record/playback tape speed of only 60 ips.

In each of the above embodiments of microgap recording, the indicated tape transport speed corresponds to the information writing speed. Of course, writing speeds may be achieved by moving the head in question relative to the recording medium, as is done, for example, in quadruplex and helical scan recorders. In any event, microgap recording is not limited to those recorders in which the medium is moved relative to the head.

The invention has been described in detail with particular reference to preferred embodiments thereof, but it will be understood that variations and modifications can be effected within the spirit and scope of the invention.

What is claimed is:

1. In magnetic recording apparatus of the type having
   (a) a gapped magnetic head for recording information signals in a magnetic medium,
   (b) means for providing relative motion between said head and said medium, and
   (c) means for applying information signals to said head for the recording of said signals in said medium, the improvement wherein said head has an effective magnetic record gap length of less than about 15μ", said gap lying so that its length extends in the direction of relative motion between said head and medium.

2. In magnetic recording apparatus of the type having
   (a) a gapped magnetic head for recording information signals in a magnetic medium,
   (b) means for providing relative motion between said head and said medium, and
   (c) means for applying information signals to said head for the recording of said signals in said medium, said information signals having a bandwith significantly in excess of one full octave, the improvement wherein said head has an effective magnetic record gap length of less than about 15μ", said gap lying so that its length extends in the direction of relative motion between said head and medium.

3. In magnetic recording apparatus of the type adapted to produce a multitrack recording, said apparatus having
   (a) a multitrack magnetic head for recording information signals in respective tracks of a magnetic medium, said multitrack head being comprised of a plurality of gapped magnetic cores,
   (b) means for providing relative motion between said multitrack head and said medium, and
   (c) means for applying respective information signals to the cores of said magnetic head for the recording of said signals in said medium in tracks respective of said cores, the improvement wherein the effective magnetic gap lengths of a plurality of said cores are respectively less than about 15 μ".

4. In magnetic recording apparatus of the type adapted to produce a multitrack recording, said apparatus having
   (a) a multitrack magnetic head for recording information signals in respective tracks of a magnetic medium, said multitrack head being comprised of a plurality of gapped magnetic cores, (b) means for providing relative motion between said multitrack head and said medium, and (c) means for applying respective information signals to the cores of said head for the recording of said signals in said medium in tracks respective of said cores, at least some of said information signals having respective bandwidths significantly in excess of one full octave, the improvement wherein the effective magnetic gaps of a plurality of said cores are respectively less than about 15 $\mu''$.

5. Magnetic recording apparatus comprising (a) a magnetic medium comprising magnetic particles having both cubic crystalline and acicular shape anisotropies, (b) magnetic head means for recording information signals in said medium, said magnetic head means being provided with a gap having an effective magnetic gap length less than about 15 $\mu''$, and (c) means for providing relative motion between said medium and said magnetic head means while recording signals in said medium such that said motion is in the direction of said gap length.

6. Magnetic recording apparatus comprising (a) a magnetic medium comprised of magnetic particles having both cubic crystalline and acicular shape anisotropies, (b) multitrack magnetic recording head means for recording bands of information signals in respective tracks of said medium, said magnetic head means being comprised of a plurality of magnetic cores having respective recording gaps which have respective effective magnetic gap lengths which are less than about 15 $\mu''$, and (c) means for providing relative motion between said medium and said magnetic head means while recording signals in said medium.

7. Magnetic recording apparatus comprising (a) a magnetic medium comprised of magnetic particles having both cubic crystalline and acicular shape anisotropies, (b) means for producing a plurality of octaves of information signals, (c) magnetic recording head means for receiving and recording said plurality of octaves of information signals in said medium, said head means having an effective recording magnetic gap length of less than about 15 $\mu''$, and (d) means for providing relative motion between said medium and said magnetic record head means while recording said signals in said medium, said medium being in the direction of said gap length.

8. The apparatus of claim 7 wherein said magnetic head means is a multitrack head having discrete magnetic cores, each of which cores has a record gap having an effective magnetic gap length which is less than about 15 $\mu''$.

9. The apparatus of claim 8 wherein said means for producing said plurality of octaves of information signals is means adapted to pre-emphasize high frequency components of said octaves of information signals.

10. The apparatus of claim 7 wherein said means for producing said plurality of octaves of information signals is means adapted to pre-emphasize high frequency components of said octaves of information signals.

11. In the magnetic recording of information by a magnetic recording head onto a magnetic medium during relative motion between the head and the medium, the novel combination for providing improved channel capacity, signal-to-noise, and noise power ratio, comprising a head having an effective magnetic record gap length of less than about 15 $\mu''$ and a magnetic medium comprised of magnetic particles having both cubic crystalline and acicular shape anisotropies, said gap length extending in the direction of relative motion between head and medium.

12. A method of magnetic recording to provide improved channel capacity, signal-to-noise, and noise power ratio, comprising recording by means of a recording head having an effective magnetic record gap length of less than about 15 $\mu''$ onto a magnetic medium comprised of magnetic particles having both cubic crystalline and acicular shape anisotropies, while providing relative movement between the head and the medium which is in the direction of relative head to medium motion.

* * * * *

UNITED STATES PATENT AND TRADEMARK OFFICE
CERTIFICATE OF CORRECTION

PATENT NO. : 4,302,790
DATED : November 24, 1981
INVENTOR(S) : James U. Lemke It is certified that error appears in the above—identified patent and that said Letters Patent is hereby corrected as shown below:

Column 10, line 9, change "medium" to ---motion---.

Column 10, lines 42 and 43, change "relative head to medium motion" to ---said gap length---.

Signed and Sealed this

Twenty-ninth Day of June, 1993

Attest:

MICHAEL K. KIRK

*Attesting Officer*      Acting Commissioner of Patents and Trademarks

REEXAMINATION CERTIFICATE (3776th)
United States Patent [19]
Lemke

[11] B1 4,302,790
[45] Certificate Issued   *Jun. 8, 1999

[54] MAGNETIC RECORDING HEAD WITH EFFECTIVE MAGNETIC GAP LENGTH LESS THAN ABOUT 15μ INCHES

[75] Inventor: James U. Lemke, Del Mar, Calif.

[73] Assignee: Eastman Kodak Company, Rochester, N.Y.

Reexamination Requests:
No. 90/003,108, Jun. 28, 1993
No. 90/003,515, Aug. 2, 1994

Reexamination Certificate for:
Patent No.: 4,302,790
Issued: Nov. 24, 1981
Appl. No.: 06/029,095
Filed: Apr. 11, 1979

[*] Notice: This patent is subject to a terminal disclaimer.

Certificate of Correction issued Jun. 29, 1993.

[51] Int. Cl.$^6$ ............................... G11B 5/23; G11B 5/62
[52] U.S. Cl. .......................................... 360/119; 360/131
[58] Field of Search ..................... 360/119–121, 131–136

[56] References Cited

U.S. PATENT DOCUMENTS

3,807,043  4/1974  Hikino.
3,958,272  5/1976  Rotter.

OTHER PUBLICATIONS

Legras, "Magnetic Recording Elements And Their Preparation", Research Disclosure, Dec. 1977, pp. 68–72.

Muramatsu, "Characteristics of Magnetic Modulation Noise", Electronic Communication Society of Japan, Category 22, pp. 1–12, Jun. 24, 1965.

Seehawer, "Magnetic Heads Featuring Extremely Narrow Gaps", Radio Mentor Electronic, Jahrgang 40, pp. 312–313, Aug. 8, 1974.

Potgiesser, "Wear of Magnetic Heads", Proceedings of the Conference on Video and Data Recording, Univ. of Birmingham, pp. 203–212, Jul., 1973.

Potgiesser, "Mechanical Wear and Degeneration of the Magnetic Properties of Magnetic Heads caused by the Tape", The Radio and Electronic Engineer, vol. 44, No. 6, pp. 313–318, Jun., 1974.

Kihara, "Development of a New System of Cassette Type Consumer VTR", IEEE Transaction on Consumer Electronics, pp. 26–36, Feb. 1976.

Model VBT 200 Technical Publication, RCA Corporation Consumer Electronics, pp. 1–1–1–39, Feb. 1976.

Jobe, "Selecta Vision VCR—A VHS Video Cassette Recorder", RCA Engineer, vol. 25, No. 1, pp. 45–47, Jun./Jul. 1979.

SKC 2096 titled "Magnetic Head—Tri–Bar", Video Systems International, Anaheim, California, dated Dec. 7, 1974.

"BASF—Ace of AV Poker", Radio Mentor Electronic, Jahrgang 40, pp. 314–315, Aug. 1974.

Umeki, "A New High Coercive Magnetic Particle for Recording Tape", IEEE Transactions on Magnetics, vol. MAG–10, pp. 655–656, Sep. 1974.

Imaoka, "Characteristics of Cobalt Adsorbed Iron Oxide Tapes", IEEE Transactions on Magnetics vol. MAG–14, No. 5, pp. 649–654, Sep. 1978.

Smaller, "Reproduce System Noise in Wide–Band Magnetic Recording Systems", IEEE Transactions on Magnetics, vol. MAG–1, No. 4, pp. 357–363, Dec. 1965.

Muramatsu, "Limitation in the Coercive Force of Video Tapes by the Head Saturation," Television Gakkai Zennkoku Yaikai Yokousyuu, pp. 177, 178, 1971.

(List continued on next page.)

*Primary Examiner*—R. S. Tupper

[57] ABSTRACT

Rather than the prior art practice of magnetically recording with a relatively long record gap, the disclosed invention teaches the use of a magnetic record gap length of less than 15μ". Such of a record gap length provides improved performance in a variety of recorders.

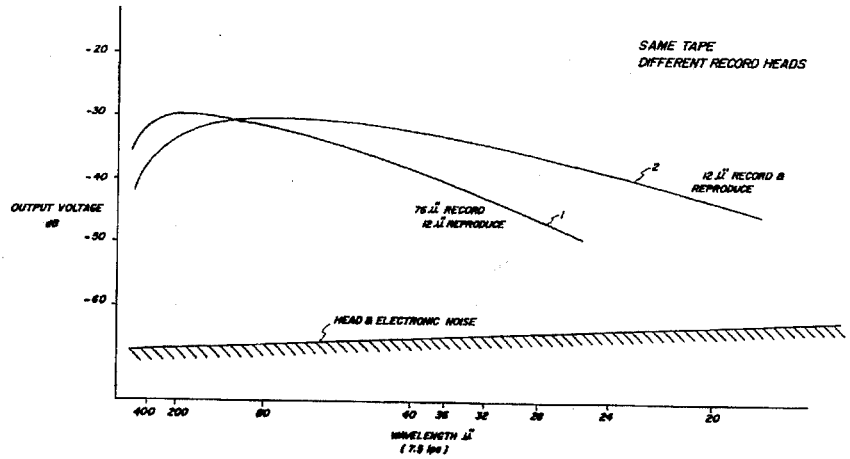

OTHER PUBLICATIONS

Flanders, "Changes in the Magnetization of a Recording Tape Produced by Heating," IEEE Transactions on Magnetics, vol. MAG–13, No. 5, Sep. 1977, pp. 1681–1687, 1977.

Inatsu, The Journal of the Institute of Television Engineers of Japan, vol. 26, No. 5, 1972, p. 374.

Siemens catalogue page listing magnetic properties, in German, of MnZnFerrite and NiZnFerrite, 1972/73.

Kobayashi, Television Gakkai Gijutsu Houkoku, vol. 1, No. 13 VR28–2, pp. 44 and 48, 1978.

Mallinson, "One–Sided Fluxes—A Magnetic Curiosity?" IEEE Transactions on Magnetics, vol. MAG–9, No. 4, Dec. 1973, pp. 678–682.

Tjaden et al, "A 5000:1 Scale Model of the Magnetic Recording Process," Phillips Technical Review, vol. 25, No. 11/12, pp. 319–325, 1963/64.

Iwasawa et al, "Simulation of Magnetic Recording Mechanism by Large–Size Model Head," Magnetic Recording Research Meeting Information from the Library of the Hitachi Central Research Lab., pp. 1–8, 1966.

Inatsu et al, "VTR Technology," Compiled by Television Society, Japan Broadcasting Publishing Association, pp. 55 and 80, 1969.

Abe et al, "X–Ray Microanalyzer and Its Applications," from the Jul. 1972 NHK Technical Research Monthly Reports, pp.287 and 292.

NHK and Fuji authors, "High–Density Video Tape Using Fine–Particle Cobalt Ferrite," Television, vol. 26, No. 5, pp. 369 and 374, 1972.

Sawazaki, "VTR," Progress in Electronic Engineering Series, published by Corona, pp 37–44, 1977.

Bartels et al, "Landolt–Bornstein," Numerical Values and Functions from Physics, Chemistry, Astronomy, Geophysics and Technology, pp. 1–119, 1962.

Tsunoo, "Tape Recorders," published by Nikkan Kogyo Shimbun–sha, Sec. 2.4.2, pp. 14, 15, 1978.

Kihara, "Video Recording Technology," published by Sanpo, pp. 23, 34 and 35, 1969.

Tamai et al, "the Preparation of Magnetic Alloy Powder by the Borohydride Process and Video Performance of the Video Tape Using It," Recording Research Society Data No. MR 73–27 of the Instituted of Electronics and Communications Engineers, pp. 15–24, 1974.

IBM Technical Disclosure Bulletin, "Polishing Ferrites With Magnesium Oxide," by Mendel et al, p. 2343, 1975.

"Mechano–Chemical Polishing bo MnZnFerrite Single Crystals," by Watanabe, Bull. Japan Soc. of Prec. Engg. vol. 8, No. 4 (Dec. 1974), pp. 155–156.

"Wear of Magnetic Heads," Proceedings of the Conference on Video & Data Recording, pp. 203–212, Potgiesser et al, 1973.

The Physics of Magnetic Recording, by C. D. Mee, pp. 56–61, 1964.

The Physics of Magnetic Recording, by C. D. Mee, pp. 99–101, 1964.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–12, are cancelled.

* * * * *